(12) United States Patent
Rahm

(10) Patent No.: US 11,390,041 B2
(45) Date of Patent: Jul. 19, 2022

(54) APPARATUS FOR SEALING AN EDGE OF A MATERIAL

(71) Applicant: Richard Rahm, Monclova, OH (US)

(72) Inventor: Richard Rahm, Monclova, OH (US)

( * ) Notice: Subject to any disclaimer, the term of this patent is extended or adjusted under 35 U.S.C. 154(b) by 0 days.

(21) Appl. No.: 17/225,418

(22) Filed: Apr. 8, 2021

(65) Prior Publication Data

US 2021/0316514 A1    Oct. 14, 2021

Related U.S. Application Data

(60) Provisional application No. 63/007,376, filed on Apr. 9, 2020.

(51) Int. Cl.
| | | |
|---|---|---|
| *B32B 41/00* | (2006.01) | |
| *B29C 65/78* | (2006.01) | |
| *B29C 65/14* | (2006.01) | |
| *B29C 65/08* | (2006.01) | |
| *B29C 65/00* | (2006.01) | |

(52) U.S. Cl.
CPC .......... *B29C 65/7841* (2013.01); *B29C 65/08* (2013.01); *B29C 65/1412* (2013.01); *B29C 66/1122* (2013.01)

(58) Field of Classification Search
CPC . B29C 65/7841; B29C 65/08; B29C 65/1412; B29C 66/1122

USPC .................... 156/60, 64, 350, 351, 378, 379
See application file for complete search history.

(56) References Cited

U.S. PATENT DOCUMENTS

| | | | |
|---|---|---|---|
| 5,139,604 A | 8/1992 | Mitchell | |
| 6,620,270 B2 | 9/2003 | Ehlert | |
| 6,664,470 B2 | 12/2003 | Nagamoto | |
| 6,820,923 B1 | 11/2004 | Bock | |
| 7,874,832 B2 | 1/2011 | Kujawa | |
| 10,752,388 B2 | 8/2020 | Rahm | |
| 2011/0274921 A1 | 11/2011 | Li | |
| 2019/0084710 A1* | 3/2019 | Wolf | B65B 61/188 |
| 2019/0375042 A1* | 12/2019 | Ralls | B33Y 30/00 |

\* cited by examiner

*Primary Examiner* — Michael N Orlando
*Assistant Examiner* — Joshel Rivera
(74) *Attorney, Agent, or Firm* — Schaffer, Schaub & Marriott, Ltd.

(57) ABSTRACT

An apparatus is described for securing an edge of the material to a support surface. A guide surface is positioned adjacent the edge to be secured. A weld head engages the edge of the material in a plurality of locations. A drive mechanism advances the weld head on the guide surface. The weld head engages the edge of the material and transfers energy to secure the edge of material in the desired position on the support surface.

16 Claims, 6 Drawing Sheets

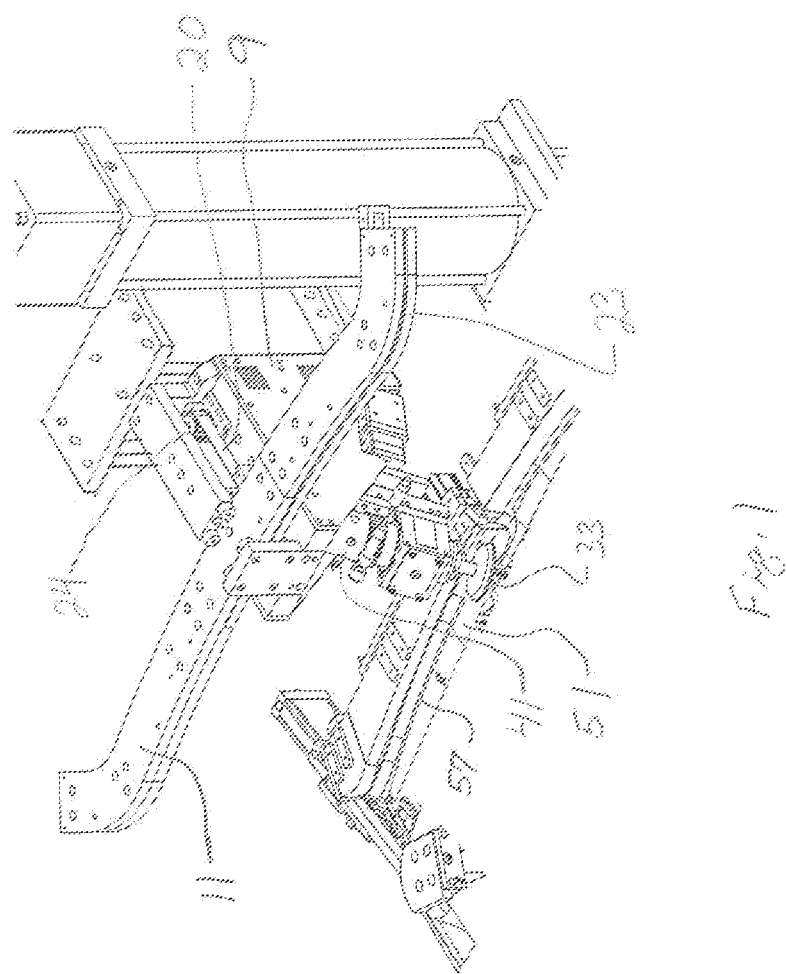

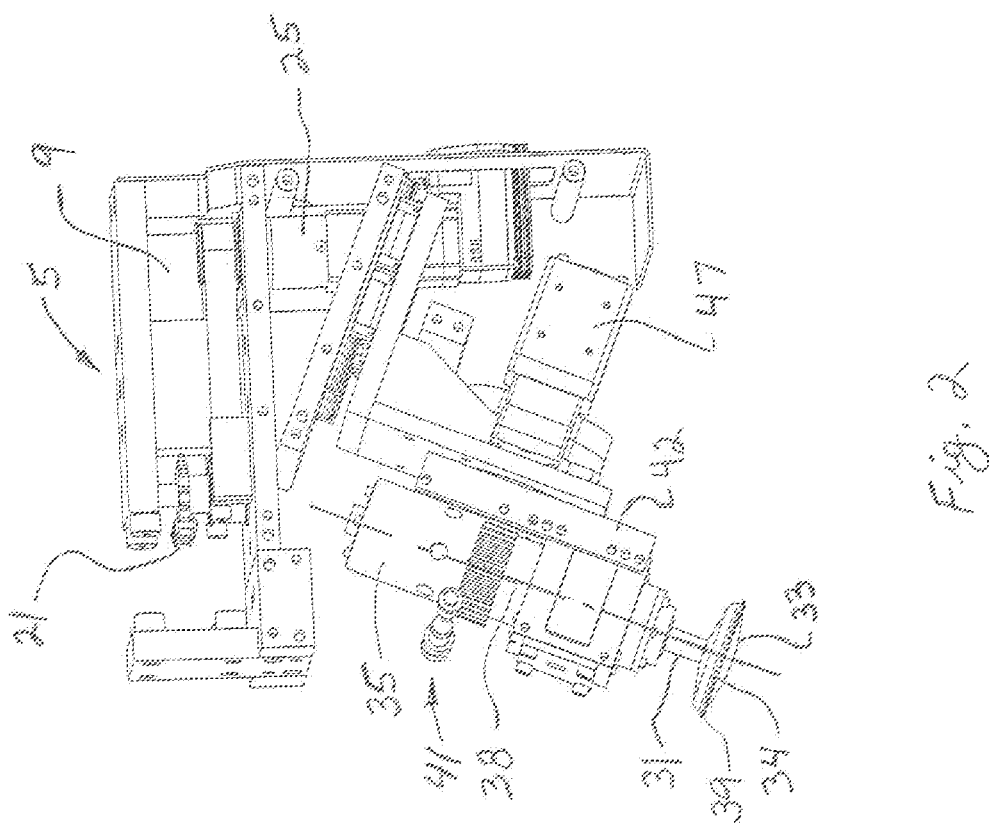

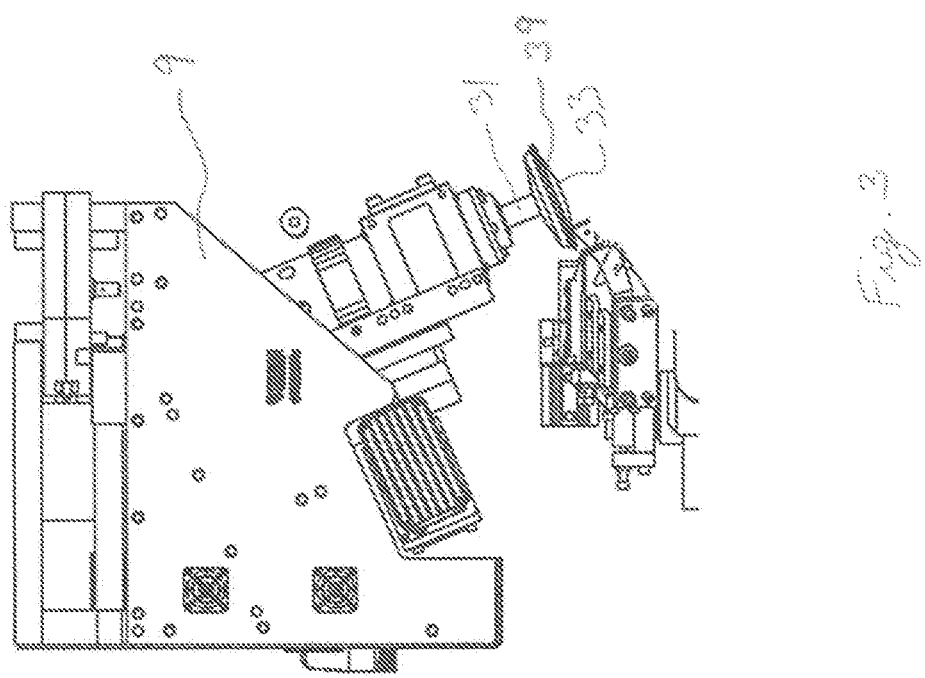

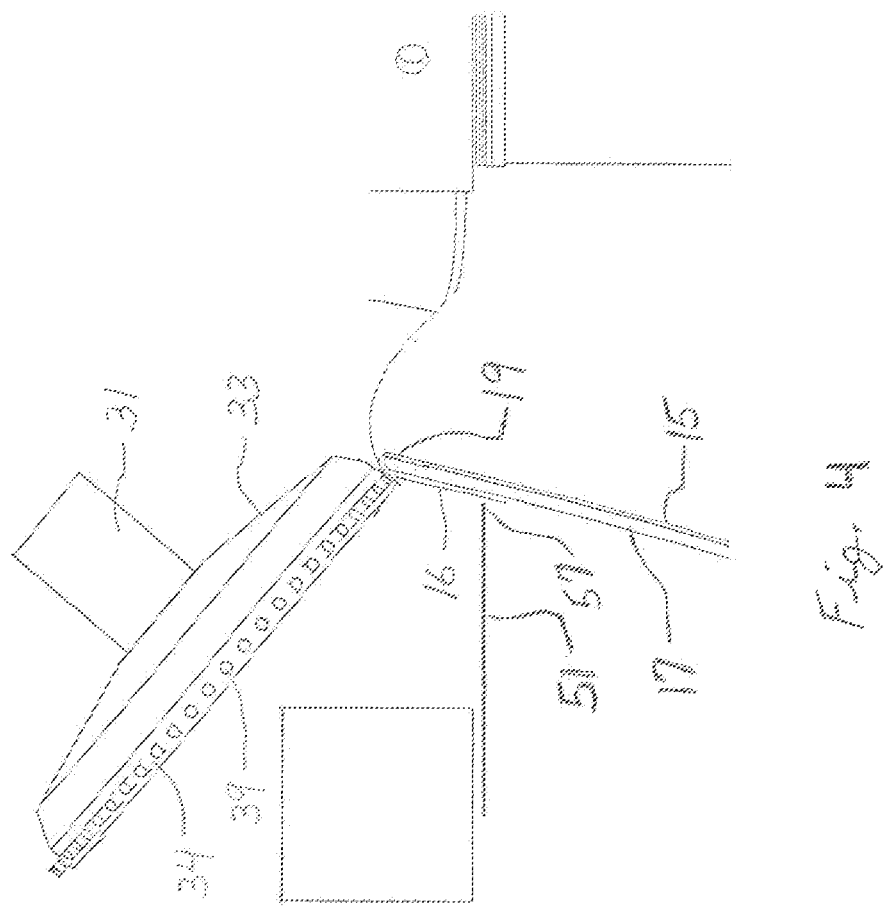

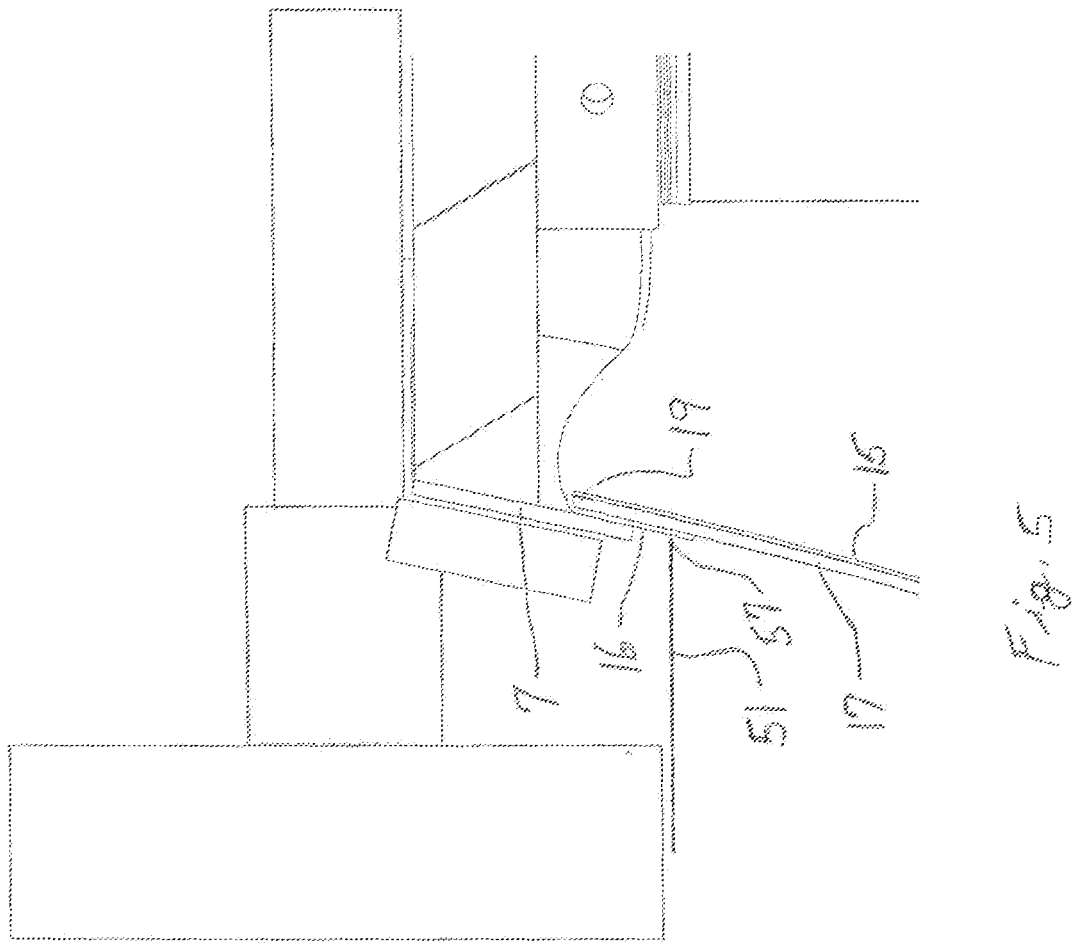

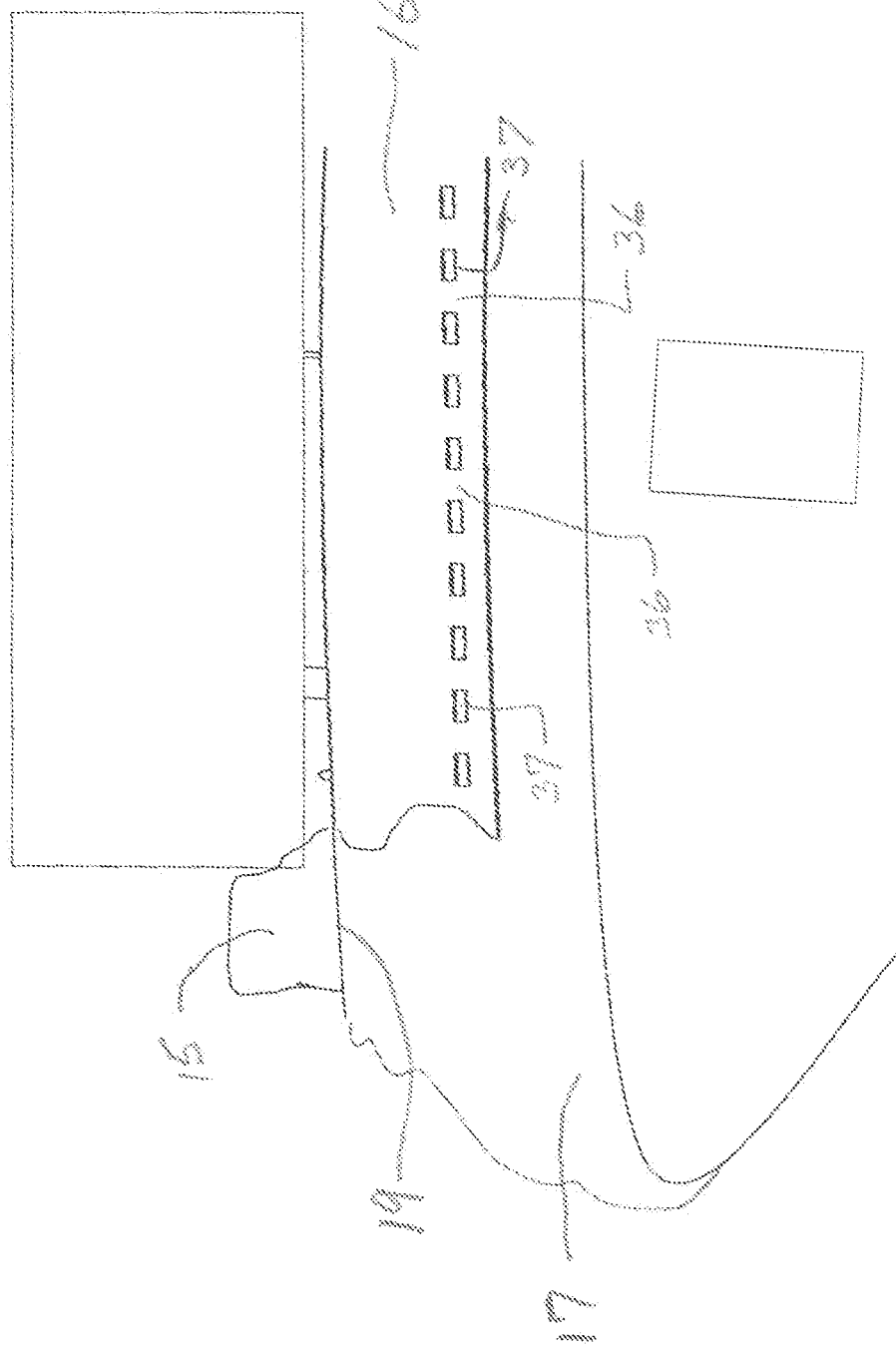

APPARATUS FOR SEALING AN EDGE OF A MATERIAL

CROSS REFERENCE TO RELATED APPLICATION

The present application claims the benefit of U.S. Provisional Patent Application, Ser. No. 63/007,376, filed Apr. 9, 2020. All subject matter contained in the application is expressly incorporated herein.

BACKGROUND OF THE INVENTION

The invention is directed to securing cover material to an underlying structure such as a panel. Current devices to not maintain a proper orientation of the cover material with respect to the underlying structure. This results in a poor finish for the part and high scrap rates for parts that are in the final finishing stages. The cycle time for the prior devices are also longer than desired. There is a need for an improved device to secure cover material to a part.

SUMMARY OF THE INVENTION

An apparatus is described for securing an edge of the material to a support surface. A guide surface is positioned adjacent the edge to be secured. A weld head engages the edge of the material in a plurality of locations. A drive mechanism advances the weld head on the guide surface. The weld head engages the edge of the material and transfers energy to secure the edge of material in the desired position on the support surface.

These and other features and advantages of the invention will be more completely appreciated with reference to following drawings, description, and claims.

IN THE DRAWINGS

FIG. 1 is a perspective view of the invention.
FIG. 2 is a cross sectional perspective view of the invention.
FIG. 3 is a side elevational view of the invention.
FIG. 4 is a partial side elevational view of the invention.
FIG. 5 is a partial side elevational view.
FIG. 6 is a partial side elevational view.

DETAILED DESCRIPTION OF THE INVENTION

The invention is directed to an apparatus for securing an edge of a material. The apparatus utilizes a weld head that secures the material to a part or underlying support structure. In most applications, the weld head will secure a folded edge of the material that is wrapped around an edge of the support structure. The features of the invention will be more readily understood by referring to the attached drawings along with the following description.

The apparatus is used to finish the edges of parts such as headliners, door panels and other trim pieces for vehicles. The apparatus is primarily used to bond or secure the folded edge of cover material on the back or non-visible side of a part. The bonding usually takes place after the cover material has been folded around an edge of the part. Although securing a folded edge of a cover material is the primary application, the apparatus can be used to secure a cover material to the surface of a part or structure with or without the folding operation. The apparatus can be used to secure or bond materials such as fabric, carpet, vinyl, leather, and other similar materials. The material can be secured to a variety of parts that have surfaces that can be bonded with the cover material. In most applications the parts are made of a thermoplastic material that becomes molten by the application of the energy from the weld head. The molten material of the part is then bonded to the cover material when the part cools. The cover material can also be a thermoplastic material that becomes molten when subjected to the energy from the weld head. The cover material and the material of the part need to have compatible characteristics to form an acceptable level of bonding. The apparatus of the present invention engages the surface of the cover material holds the cover material in a desired position until the bonding process is completed. This results in high quality parts the cover material has an acceptable appearance without sagging, wrinkles, or other inconsistencies.

The apparatus 5 has a carriage 9 that is positioned on a movable transport system 11 such as a gantry, a robot, a cam surface, or any similar systems. The transport system moves the apparatus along a defined path that is adjacent to the material 15 that is to be secured. As shown in the figures, a chain drive system can be used to transport the apparatus 5 along the desired path. A sprocket 21 is rotatably mounted on the carriage 9 and the sprocket is caused to rotate by a drive chain 20 that is connected to a gear 24. The sprocket is designed to engage a guide chain 23. The guide chain is disposed adjacent to the material that is to be secured and defines the desired path for the advancement of the carriage 9. Rotation of the sprocket will advance the carriage along the guide chain 23. A suitable drive or servo motor 25 is operatively connected to the sprocket by the drive chain 22 to cause the sprocket to rotate and move the carriage along the desired path defined by the guide chain 23. A variety of other systems, such a robot, a gantry, a cam surface, or a programmable motion system, could be utilized to move the apparatus along a desired path adjacent the material to be secured or bonded.

In most applications the cover material, as shown in FIG. 8, is wrapped around an edge 19 of the underlying structure 17 upon which the cover material is positioned. Several devices can be utilized to fold the cover material over the edge 19. In practice it has been found that the edge folding apparatus 7 described in U.S. Pat. No. 10,752,388 works well to accomplish the folding operation. The edge folding apparatus described in the '388 patent is hereby incorporated by reference into this patent application should be considered as part of the description of the invention.

A rotatable weld head 31 is positioned on the carriage 9. The weld head is usually an ultrasonic welding device. However, it should be appreciated that other types of welding devices such as hot air, infra-red or a heated surface can be utilized to accomplish the welding operation. The type of welding device that is utilized will depend upon the cover material to be secured and the material of the part or underlying structure 17. An ultrasonic welder made by Aurizon has been found to work well in many applications. The weld head 31 has a rotary head 33 that rotates when the weld head is being utilized. The rotary head 33 is designed to engage the cover material 15 that is to be secured. The weld head is usually caused to rotate by the engagement with the cover material as the weld head is advanced. The rotary head is usually round and can also be driven by a motor 35 that causes the head to rotate. In most applications a plurality of projections 39 are positioned on the outer perimeter of the weld head 33. The plurality of projections is disposed to engage the cover material 15 and to transfer the energy from the weld head to the cover material 15. The transfer of the energy is sufficient to cause the cover material 15 to be welded, secured, or bonded to the material of the underlying structure 17. The thermoplastic material of the underlying structure becomes molten with the application of the energy from the projections on the weld head and this allows the underlying structure to bond to the cover material. The material 16 is only secured where the projections 39 engage the folded covered material. As there are spaces 34 between the projections, there will be spaces 36 between the areas 37 of the cover material that are bonded or secured to the underlying structure. The projections are designed to engage and hold the folded cover material against the underlying structure while the welding process is completed.

The weld head 31 is movably mounted on a gear unit 41 that has a servo motor 42. The servo motor of the gear unit can be utilized to change the angular position of the rotary head 33 to the desired angular location with respect to the cover material. The angular position or camber of the weld head is relative to an axis 38 taken along the center line of the gear unit 41. The camber or angular position of the weld head can be modified to change how the weld head engages the folded cover material 16. Advancing the angular position of the weld head in a direction towards the direction of advancement of the weld head causes the weld head to more firmly engage the cover material 15. Advancing the weld head 33 in the opposite direction reduces the engagement of the weld head with the cover material. The servo motor 42 can change the angular position from about 0° to 10° in each direction from the vertical axis 34. The gear unit is mounted on an air cylinder 47. The air cylinder is designed to move in a manner to place the projections 39 of the weld head 31 into contact with the material 15. The gear unit can be moveably mounted on suitable bearings to facilitate the movement of the gear unit by the air cylinder. The air cylinder provides a biasing force from about 2 pounds to about 160 pounds to maintain the weld head 31 against the cover material. In practice it has been found that a biasing force from about 20 pounds to about 60 pounds works well in most applications. The biasing force provided by the air cylinder assists in keeping the weld head and the plurality of projections 39 in engagement with the cover material 15 as the weld head advances relative to the part or underlying structure 17. The compliance or biasing force allows the weld head to accommodate changes in the underlying structure, such as corners, variations between parts or changes in contour, without losing contact with the cover material. In most applications both linear and angular movement are provided by the gear unit 41.

A leading-edge guide 51 is moveably positioned adjacent to the carriage 9. Leading-edge guide has a shape that conforms to the underlying structure 17 where the folded cover material 16 is located. The leading-edge guide is disposed to be moved into a position adjacent the folded cover material. The leading-edge guide is usually made from a non-ferrous metal, but it should be appreciated that other suitable materials can also be used for this component. The leading-edge guide 51 has a guide surface 57 that is designed to engage and hold the folded material 16 in the desired position. The guide surface engages the portion of the folded cover material that is spaced apart from the edge 19 of the underlying structure 17. The leading edge guide can be designed to cover the portion of the folded cover material around the entire underlying structure. This will tension and hold the folded cover material in the desired location for the welding or bonding provided by the weld head. The leading edge guide can be advanced to engage the folded cover material prior to the bonding by the weld head. The rotary head 33 of the weld head 31 contacts the folded cover material between the edge 19 and the guide surface 57 and bonds the fold material to the underlying surface. The leading-edge guide is disposed to engage the folded material as the weld head is positioned to engage the folded material. The material 15 can be folded over the edge by the edge folding apparatus 7. Once the cover material is folded, the edge folding apparatus is moved away from the material after the leading-edge guide engages the folded material. In some applications it has been found that the leading-edge guide can be operatively connected to the carriage 9 and the guide surface 57 is designed to engage only a small portion of the folded cover material. The guide surface moves with the weld head and contacts the folded cover material in advance of the rotary head 33 contacting the folded cover material. The guide surface functions as previously described to maintain the folded cover material in the desired location for the bonding process by the rotary head.

In operation, the cover material 15 is positioned on the part or underlying structure 17. The cover material is folded over the edge 19 of the part. A folding apparatus 7 as disclosed in U.S. Pat. No. 10,752,388 can be utilized to accomplish the folding of the cover material. The leading-edge guide 51 is then positioned to have the guide surface 57 engage the portion of the folded cover material 16 that is spaced apart from the edge 19 of the underlying structure 17. The guide surface pushes the cover material against the surface of the underlying structure and moves the material away from the edge 19. This positioning of the guide surface places the cover material under tension and holds the cover material in the desired location on the underlying structure. The edge folding apparatus is moved away from the folded cover material once the guide surface engages the folded cover material. The weld head 31 is then positioned adjacent the folded cover material. The rotary head 33 is then brought into contact with the portion of folded cover material that is located between the edge 19 and the guide surface 57. The gear unit 41 can be used to position the rotary head in the desired angular position with respect to the cover material. The air cylinder 47 on which the gear unit is mounted can be used to bring the projections 39, on the weld head 31, into contact with the folded cover material 16. The air cylinder holds the projections against the folded cover material with a biasing force that is sufficient to maintain the projections in contact with the cover material during the bonding or welding operation. Once the weld head is in the desired location with respect to the folded cover material, the drive motor 25 is engaged to cause the gear 24 to rotate. The rotation of the gear 24 moves the guide chain 23 and the movement of the guide chain causes the sprocket 21 to rotate. Rotation of the sprocket causes the carriage 9 and the weld head 31 to advance along the guide chain 23. As the carriage moves along the guide chain, the rotary head 33 of the weld head 31 is caused to rotate as the rotary head engages and moves along the folded cover material. As the rotating rotary head 33 moves along the folded cover material, ultrasonic energy is supplied to the projections 39 and the ultrasonic energy welds or bonds the folded cover material to the underlying structure 17 in a manner previously described. If necessary, the camber or angular position of the weld head can be modified by the gear unit 41 to keep the projections 39 in the desired contact with the folded cover material 16. Once the bonding process is completed, the carriage 9 stops moving, the weld head 31 is moved away from the cover material, and the apparatus is ready to be used to weld cover material on another part.

The above description is designed to describe the invention; however, modifications and alternatives may be made without departing from the spirit and scope of the invention as defined in the following claims.

The invention claimed is:

1. An apparatus for securing an edge of a material to a thermoplastic surface comprising:
    a guide mechanism positioned adjacent the edge to be secured, the guide mechanism being disposed to engage the edge of the material to fold the edge of the material over an edge of the support surface;
    a carriage moveably positioned adjacent the guide mechanism;
    a drive mechanism to advance the carriage on a guide surface and a weld head positioned on the carriage, the weld head disposed for engaging the edge of the material, the weld head designed to contact the edge of the material in a plurality of spaced apart locations, the weld head transferring energy to the areas of the edge of the material that is contacted by the weld head to secure the edge of the material in the desired position on the support surface; and
    a guide disposed for engaging the folded edge of the material to assist in holding the material in place against the support surface while the material is engaged by the weld head.

2. The apparatus of claim 1 wherein the weld head is an ultrasonic or infrared device.

3. The apparatus of claim 2 wherein a linear actuator is operatively connected to the guide and advances the guide to engage the folded material.

4. The apparatus of claim 3 wherein the weld head is disposed to engage the folded material between the edge of the support surface and the guide.

5. The apparatus of claim 1 wherein the weld head has a plurality of projections, the projections disposed to transfer energy to the material and the support surface to bond the material to the support surface.

6. The apparatus of claim 5 wherein the plurality of projections are separated by a space between adjacent projections.

7. The apparatus of claim 6 wherein the weld head is rotatable and the plurality of projections are advanced with respect to the material as the weld head is rotated.

8. The apparatus of claim 7 wherein the weld head is mounted on an air cylinder, the air cylinder providing a biasing force from about two pounds to about 160 pounds to hold the weld head in engagement with the material.

9. The apparatus of claim 8 wherein the weld head is mounted on a rotatable gear unit, the gear unit can be rotated to change the angular position of the weld head with respect to the material.

10. The apparatus of claim 9 wherein the weld head is designed to transfer energy to a material that is fabric, carpet, vinyl, leather, and other similar materials.

11. A method for securing an edge of a thermoplastic support surface comprising:
    positioning a guide surface adjacent the edge to be secured, engaging the edge of the material with the guide mechanism to fold the edge of the material over the support surface;
    advancing a weld head with respect to the guide surface, the weld head engaging the edge of the material as the weld head is advanced, the weld head contacting the edge of the material in a plurality of spaced apart locations;
    transferring energy from the weld head to the areas of the edge of the material contacted by the weld head to secure the material to the support surface, and;
    engaging the fold edge of the material with a guide, the guide assisting in holding the material in place against the support surface while engaging the material with the weld head.

12. The method of claim 11 in which the weld head is rotated with respect to the material.

13. The method of claim 12 in which the weld head contacts the material in a plurality of locations and transfers energy to the material and support surface only at the locations where the weld head contacts the material.

14. The method of claim 13 in which a guide surface engages the material and holds the material in a desired location while the material is secured to the support surface.

15. The method of claim 11 in which an air cylinder is operatively connected to the weld head, the air cylinder biasing the weld head against the material with a biasing force from about 2 pounds to about 160 pounds.

16. The method of claim 11 in which a gear unit is operatively connected to the weld head, the gear unit capable of changing the angular position of the weld head with respect to the material to be secured.

* * * * *